Sept. 6, 1960 T. O. SUMMERS, JR 2,951,375
RATE INTEGRATING GYRO
Filed Feb. 24, 1954 4 Sheets-Sheet 1

THOMAS O. SUMMERS, JR.
INVENTOR.

BY R. E. Geauque

ATTORNEY

Sept. 6, 1960 T. O. SUMMERS, JR 2,951,375
RATE INTEGRATING GYRO
Filed Feb. 24, 1954 4 Sheets-Sheet 2
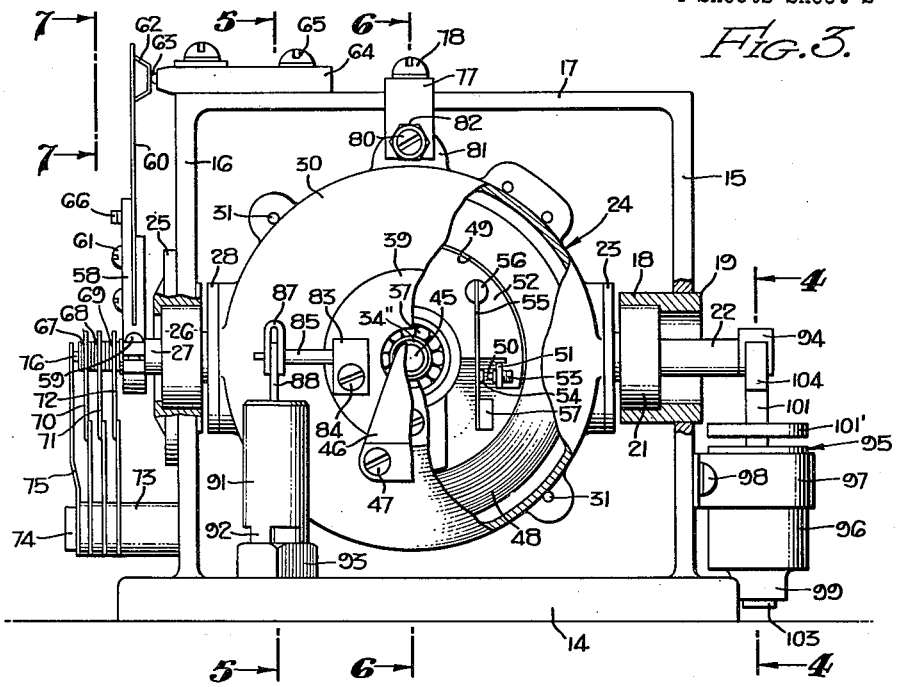
Fig. 3.
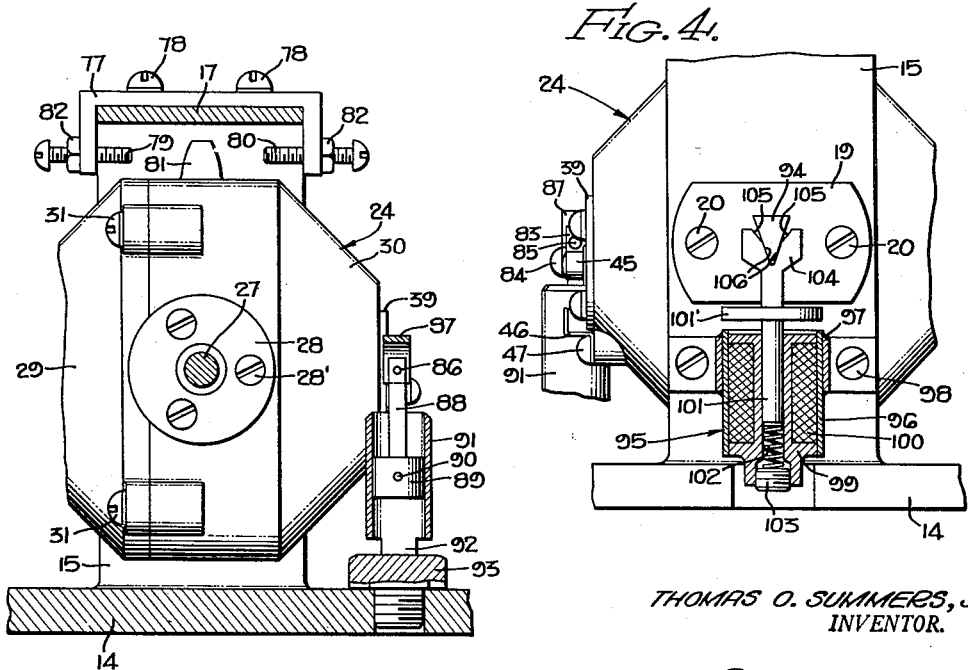
Fig. 4.
Fig. 5.
THOMAS O. SUMMERS, JR.
INVENTOR.
BY R. E. Geangue
ATTORNEY Sept. 6, 1960  T. O. SUMMERS, JR  2,951,375
RATE INTEGRATING GYRO
Filed Feb. 24, 1954  4 Sheets-Sheet 3

THOMAS O. SUMMERS, JR.
INVENTOR.

BY R. E. Geauque

ATTORNEY

Sept. 6, 1960
T. O. SUMMERS, JR
2,951,375
RATE INTEGRATING GYRO
Filed Feb. 24, 1954
4 Sheets-Sheet 4
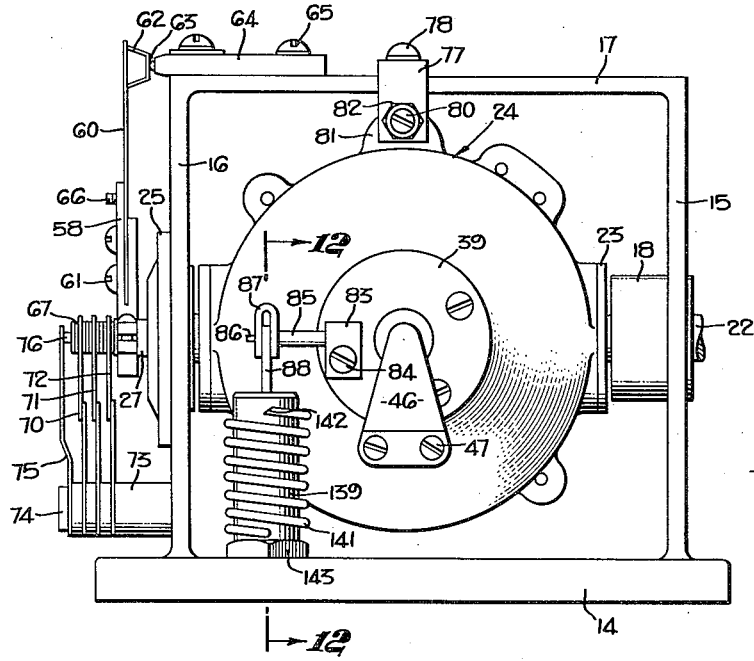
THOMAS O. SUMMERS, JR.
INVENTOR.
BY R. E. Geangue
ATTORNEY

United States Patent Office 2,951,375
Patented Sept. 6, 1960

2,951,375

RATE INTEGRATING GYRO

Thomas O. Summers, Jr., Encino, Calif., assignor to Summers Gyroscope Company, Santa Monica, Calif., a corporation of California Filed Feb. 24, 1954, Ser. No. 412,315

16 Claims. (Cl. 74—5.5)

This invention relates to gyroscopes, and more particularly to rate integrating gyroscopes. One of the simple methods of measuring angular displacements of land, air or water craft is the conventional method of employing a single-gimbal gyro adapted to precess against a resistance having the property of opposing precession with a torque or force proportional to the precessional velocity. Such a resistance is commonly provided through the expedient of a viscous fluid such as oil. To this end it is common to hermetically seal the gimbal within an annular inner container and to envelop the inner container in the oil, which inner container and oil in turn are supported by an annular outer container, also hermetically sealed.

Such construction is obviously complicated and costly and impairs the performance of the gyro because of the high moment of inertia about the gimbal axis caused by incorporation of the annular inner container. Since the resistance provided by the oil is a function of its viscosity (which in turn is a function of the temperature of the oil), it is desirable to maintain the oil at a very nearly constant temperature. Heretofore, this has been difficult because of the large area of the inner container, which the oil must envelop. In the present invention, the oil envelops a comparatively small damping cylinder, and very little oil is therefore necessary. Thus, the problem of providing a heater element to maintain this small volume of oil at a substantially constant temperature is greatly simplified. Also, because of the small volume of the damping cylinder, the moment of inertia of the gimbal is not increased sufficiently to impair the performance of the gyro. In construction, the present invention resembles the conventional single-gimbal rate gyro, in which the gyro is restrained by springs and damped by an air dashpot comprising a piston and plunger. By the present invention, it is proposed to convert such a rate gyro to a rate integrating gyro by removing the gimbal restraining springs and by impregnating the piston and cylinder of a dashpot with a viscous fluid such as a silicone oil; and preferably both ends of the dashpot are open so as to insure damping by shearing oil particles rather than by forcing air from the cylinder. Thus the present invention seeks to provide a rate integrating gyro no more complicated than the conventional rate gyro but which has the added advantage that its output signal is the time integral of rate.

Another form of the invention utilizes the usual type of air dashpot in which a piston slides in a cylinder having one end closed and air passes through an opening at the closed end of the cylinder. However, in order to obtain a resistance torque acting on the gyro gimbal proportional to precessional velocity, the air bleed from the closed end of the cylinder is connected to atmosphere through a long tube. Since the air flow through the tube will have substantially laminar flow, the air flow will offer a resistance substantially proportional to the velocity of the piston. In each of the embodiments, the plunger for the dashpot is connected to the single gimbal of the gyro by a mechanical linkage which causes the piston to move within the cylinder upon precession of the gyro. More significant is the fact, that in each embodiment, the cylinder can be of small size and can be mounted directly upon the gyro frame adjacent the gimbal to provide a torque opposing the gimbal movement, which torque is proportional to gimbal velocity. Thus, it is apparent that in both embodiments the angular rate of the gimbal will be proportional to the angular rate of the aircraft, and, therefore, the displacement of the gimbal is proportional to the displacement of the aircraft.

Since the rate integrating gyroscope of the present invention is to be used for guidance, it is usually essential that the reference be at its null or zero signal position upon starting. Also, during operation of the guidance element, it may from time to time be necessary to reset or cage the gimbal to its null position. Therefore, another purpose of the present invention is to provide a caging device which automatically uncages the gyro at its zero signal position or some other predetermined position whenever the device is ready for operation, or more specifically, whenever the gyro rotor attains operating speed. Also, means can be provided for caging and uncaging the gyro in response to externally transmitted command signals.

It is therefore an object of the present invention to provide a rate integrating gyro comprised of a single-gimbal gyro precessing against a resistance torque proportional to precessional velocity, said resistance force being exerted through a linkage connected to the gimbal of the gyro.

Another object of the present invention is to provide a single-gimbal gyro whose precession is resisted by a torque proportional to the precessional velocity of the gyro, which torque is developed by the shearing of oil particles.

A still further object of the present invention is to provide a single-gimbal gyro whose precession is resisted by a torque proportional to precessional velocity, which torque is developed by laminar flow of air induced by the precessional force of the gyro.

Another object of the invention is to provide a control system for a movable craft in which angular displacement is derived from a single-gimbal gyro precessing against a resistance force which is proportional to precessional velocity so that the displacement signal of said gyro is a measure of angular displacement of the craft.

Another object of the invention is to provide means for caging the rate integrating gyro of this invention in order to reset the gimbal at its null position or at any other selected position and maintain such selected position until the gyro is again ready for operation.

A still further object of the present invention is to provide a rate integrating gyro having a single gimbal directly connected to a device which receives the movement of the gimbal and resists this movement with a torque which is proportional to the precessional velocity of the gimbal.

These and other objects of the invention not specifically set forth above will become readily apparent from the accompanying description and drawings in which:

Figure 3 is an elevational view of the rate integrating gyro showing the gyro rotor mounted in a single gimbal.

Figure 4 is a vertical sectional view along line 4—4 of Figure 3 showing the construction of a caging device for the rate integrating gyro.

Figure 5 is a vertical sectional view along line 5—5 of Figure 3 showing the construction of the oil-coated dashpot connected to the gyro gimbal.

Figure 6:
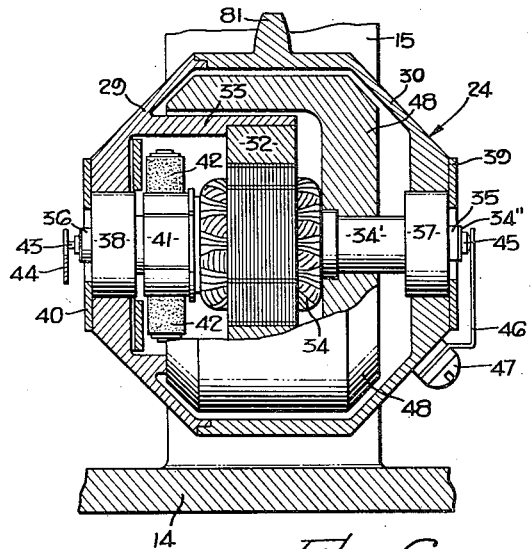

Figure 6 is a vertical sectional view along line 6—6 of Figure 3 illustrating the gyro motor and rotor mounted within the gimbal.

Figure 7:
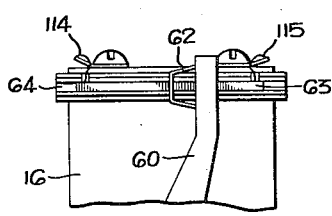

Figure 7 is an elevational view along line 7—7 of Figure 3 showing the potentiometer adjusted by the gyro to give a signal indicating displacement.

Figure 8:
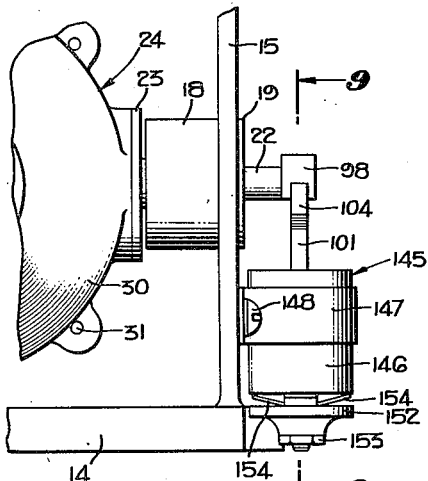

Figure 8 is a partial elevational view, similar to that of Figure 3, illustrating a modification of the caging device for the gyro.

Figure 9:
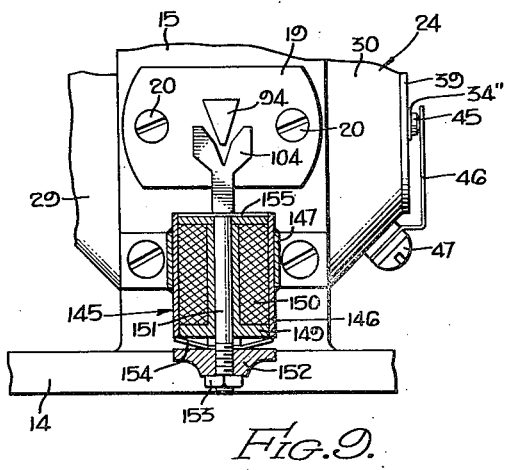

Figure 9 is a vertical sectional view along line 9—9 of Figure 8 showing the construction of the modified caging device.

Figure 10:
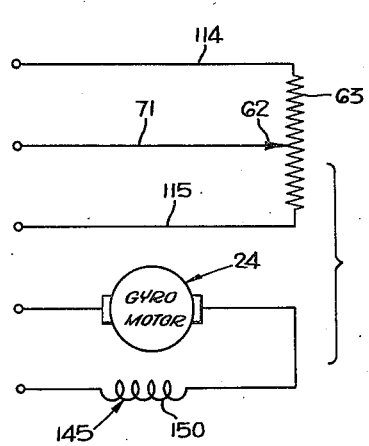

Figure 10 is a schematic wiring diagram showing how the solenoid of the modified form of caging device is connected in series with the gyro motor.

Figure 11 is an elevational view of the rate gyro equipped with a modified form of device to produce a reaction force on the gimbal proportional to precessional velocity.

Figure 12 is a vertical sectional view along line 12—12 of Figure 11 illustrating the long bleed tube connected to the closed end of the dashpot cylinder.

Figure 13 is a horizontal sectional view along line 13—13 of Figure 12 illustrating the hollow piston for the dashpot and the connection to the piston.

Referring to the form of the invention illustrated in Figure 3, the rate integrating gyro has a base 14 to which is rigidly secured upright legs 15 and 16 and a cross member 17 is connected between the legs. The leg 15 has a circular opening for receiving bearing retainer 18 which has a projection 19 secured to leg 15 by screws 20. A ball bearing 21 is positioned within the enlarged end of retainer 18 and receives shaft 22 carried by plate 23 which is secured to gimbal 24 of the gyro by means of screws. A circular opening in leg 16 receives bearing retainer 25 which is likewise secured to leg 16 by means of screws. A ball bearing 26 is held within retainer 25 and receives shaft 27 carried by a plate 28 which is secured to the gimbal 24 of the gyro by means of screw 28'. Thus, the axis of shafts 22 and 27 form the precessional axis of the gyroscope and the gyro gimbal is rotatively mounted about the precessional axis.

The gyro gimbal 24 is composed of two casing sections 29 and 30 which are secured together by screws 31. A motor magnet 32 is rigidly mounted by casing extension 33 inside the gimbal and this magnet cooperates with winding 34 on the motor shaft 34' which is rotatively supported at its ends 35 and 36 by ball bearings 37 and 38 respectively. The ball bearings 37 and 38 are mounted in openings on opposite sides of the gimbal and are provided with retainer rings 39 and 40 respectively. Rotor shaft 34' carries a number of commutator bars 41 which cooperate with stationary brushes 42 in order to supply electrical energy to the motor windings 34. The end 36 of shaft 34' contains a conducting pin 43 which is continually in contact with a conducting plate 44 carried by the gimbal by means of screws and this plate supplies electrical energy to the motor. The end 35 of shaft 34' has a conducting pin 45 which is continually in contact with the contact plate 46 likewise carried by the gimbal by means of screws 47 and this contact plate serves as ground for the motor.

A cup-shaped gyro rotor 48 is secured to the rotor shaft 34' for rotation therewith within the gyro gimbal 24. The rotor has a groove 49 in its bottom surface and an electrical contact 50 is mounted by a projection 51 carried by plate 52 positioned within this groove. The contact 50 is carried by screw 53 so its position is adjustable. A second contact 54 is carried by spring arm 55 which is secured to the gyro rotor within groove 49 by screw 56 and the end of the spring arm carries a weight 57 which is responsive to centrifugal force developed by rotation of the rotor. When the centrifugal force acting upon weight 57 is sufficient to overcome spring 55, the contact 54 will move against contact 50 to complete a circuit which controls the caging mechanism for the gyro in a manner presently to be described.

A bracket 58 is carried by shaft 27 and has a split opening receiving the shaft so that the bracket can be tightly secured to the shaft by screw 59. Wiper arm 60 is inserted within a slit in bracket 58 and is secured thereto by means of screws 61 so that the wiper arm 60 will move with shaft 27. The wiper arm carries a wiper 62 which is of substantial width so that it will remain in continual contact with straight potentiometer winding 63 carried by member 64 secured to the cross member 17 by means of screw 65. Therefore, when the wiper 62 moves in a circular arc about shaft 27, it will continually remain in contact with straight winding 63 because of its width and the pressure of wiper 62 on winding 63 can be adjusted by screw 66 carried by bracket 58. Three slip rings 67, 68 and 69 are carried at the end of shaft 27 and wipers 70, 71 and 72 coact respectively with these slip rings. The wipers are supported by insulated post 73 secured to leg 16 by means of screw 74 and the post likewise supports a wiper 75 which bears against a conducting pin 76 at the end of shaft 27. The slip ring 69 serves to supply power to the contacts 50 and 54 of the centrifugal switch, the slip ring 68 connects with the wiper 62 and the slip ring 67 supplies electrical energy to the gyro motor, while the pin 76 serves as a ground return for the motor and switch. It is therefore apparent that even though the gyro precesses with respect to its frame, electrical connection will be continually available to all of the components of the gyro.

In order to limit the precessional movement of the gyro to within the desired limits, a U-shaped bracket 77 is connected to cross member 17 by means of screws 78 and the legs of the bracket carry stop screws 79 and 80 which are positioned in the path of projection 81 secured to the gyro gimbal 24. The position of the end of the stop screws 79 and 80 is adjustable and after adjustment, both screws can be rigidly secured in place by means of lock nuts 82 on each screw so that the amount of precession allowed in either direction can be adjusted.

The means for resisting the precession of the rate integrating gyro with a force proportionate to precessional velocity will now be described. A block 83 is positioned on retainer plate 39 and is rigidly secured to the gimbal by screw 84. The block 83 has an opening for securely holding a shaft 85 having a reduced end 86 which passes through a clip 87 and through the end of link 88. The other end of link 88 projects into the hollow piston 89 and is secured to the piston by pin 90. The piston 89 slides within a cylinder 91 which is open at both ends and which is supported by projections 92 secured to nut 93, threaded to base 14. It is apparent that the arm 85 will move with the gyro gimbal upon precession and will move in a slight arc about the gimbal axis. However, since the link 88 is free to pivot about shaft end 86 and pin 90, the link will permit the piston to move within cylinder 91 without binding upon precession of the gyro and the clip 87 will serve to keep the link 88 from twisting. Since the precession of the gyro is limited to a small arc, the linear movement of the piston 90 will be substantially proportional to the degrees of precession of the gyroscope but of course, both the piston and cylinder can be curved about the same radius as shaft 85 if a large angle of precession were permitted.

In order that the piston and cylinder will exert a resistance force upon the gyro gimbal which is proportional to precessional velocity, the inner surface of the cylinder is coated with an oil film 138 which has a high adhesion to the surface of the cylinder, such as a silicon oil. Thus, the oil will remain on the surface of the cylinder and the cylinder can be open ended without danger of the oil leaving the surface of the cylinder. Upon precession of the gyro, the piston 89 will move within the cylinder and the resistance to the movement of the piston will be derived from the force required to shear the oil particles and the faster the piston moves the more oil particles will be sheared and the greater the resistance to the piston movement. There will be no damping force derived from air within the cylinder because it is open at both ends. Therefore, the resistance of the oil to movement of the piston and precession of the gyro will be proportional to the precessional velocity of the gyro so that movement of the gyro will be a measure of displacement.

Since oil is subject to becoming more viscous with decrease in temperature, it is desirable to make the cylinder 91 out of some material having a low coefficient of thermal expansion, such as Invar metal, and to make the piston out of some metal which has a high coefficient of thermal expansion, such as aluminum. With the use of such metals, the piston will contract and expand with temperature changes to provide a greater clearance between the piston and cylinder to compensate for increased viscosity of the oil, and to provide reduced clearance between the piston and cylinder to compensate for a decrease in viscosity. Therefore, it is not necessary to provide heating coils or other compensating means to keep the oil at a constant temperature, but, of course, it is understood that such heating coils could be supplied around the cylinder 91, in which event the piston and cylinder could be made of the same or comparable metals. The precessional force exerted by the gyro gimbal is, of course, proportional to aircraft rate of angular displacement, and since the torque opposing the gimbal is proportional to gimbal velocity, the angular velocity of the gimbal will be proportional to the angular velocity of the aircraft. Thus, the position of the wiper 62 will be proportional to displacement of the craft.

Since the rate integrating gyro can be a part of a guidance system it is desirable to have a caging means for caging the reference of the gyro to its null position or to any other selected position. One form of the caging device is shown in Figure 4 and includes a V-shaped wedge 94 formed at the end of gimbal shaft 22 so that the wedge will change position upon precession of the gimbal. A solenoid 95 is secured to leg 15 directly below wedge 94 and comprises a circular body member 96 which is secured to leg 15 by means of a circular bracket 97 and screws 98. The circular body member 96 contains a support member 99 around which is wound the winding 100 of the electromagnet. The support member 99 has a central, circular opening which receives one end of shaft 101 and the shaft is continually biased by spring 102, retained between the end of the shaft and a plug 103 threaded into one end of the central opening. The other end of shaft 101 carries an end member 104 having a groove comprised of side sections 105 having a greater angle than the V-angle of the wedge 94 and of sides 106 having the same V-angle as the wedge 94.

The shaft 101 likewise carries a circular armature disc 101' which is positioned within the field of the winding 100 so that when the winding 100 is energized the armature will be drawn against circular body member 96 in order to move end 104 away from wedge 94 and thereby free the wedge for rotation with the gyro gimbal. The energization of winding 100 is under control of the centrifugal switch comprised of contacts 50 and 54 mounted upon the rotor of the gyro. When the gyro rotor is started, these contacts will remain open until the gyro rotor has come up to the desired speed, at which time the centrifugal force acting on weight 57 will move contact 54 against contact 50 and close the circuit for winding 100 through lead 72. Thus, the gyro gimbal will be free to precess when the gyro rotor has come up to speed and the winding 100 has been energized to pull the end section 104 away from wedge 94 against the force of spring 102. Prior to the time the gyro rotor comes up to speed, the wedge 94 will be securely held by the surfaces 106 of the member 104 and also, when the gyro is turned off and the speed of the rotor decreases sufficiently, contact 54 will move away from contact 52 and the spring 102 will force one of the surfaces 105 against the surface of wedge 94 and cause the wedge to rotate until it becomes secured between the surfaces 106. It is understood that in addition to controlling the winding 100 by a centrifugal switch mounted on the rotor, a manual switch could be utilized to selectively energize the winding at any desired time in order to cage the gyro during the operation of the gyro.

Figure 1:
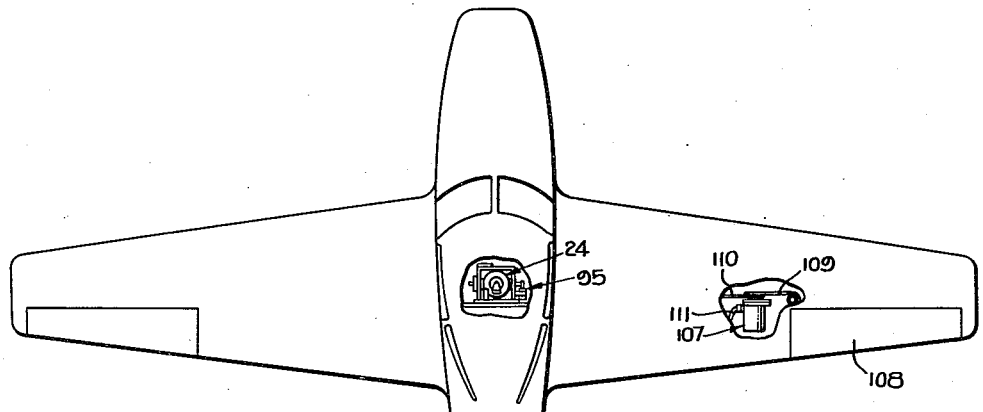
Figure 1 is a plan view of an aircraft illustrating the manner in which the rate integrating gyro and associated servo motor are carried by the aircraft.
Figure 2:
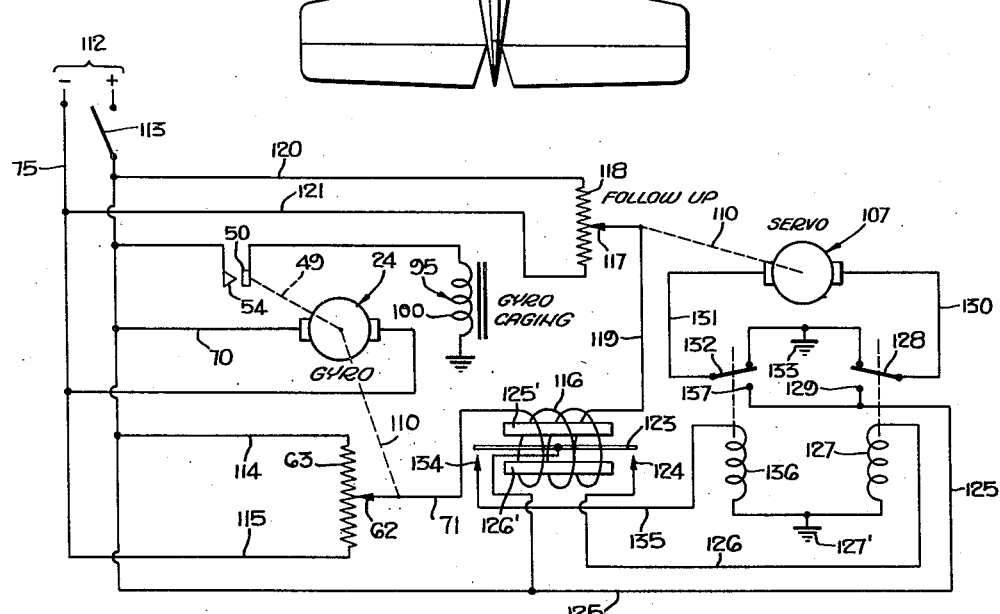
Figure 2 is a schematic wiring diagram of the control system for the aircraft utilizing the rate integrating gyro.

The guidance system, employing the rate integrating gyro just described, will now be discussed in connection with Figures 1 and 2. In Figure 1, the rate integrating gyro is shown mounted in an aircraft and oriented therein to control the aircraft about the roll axis. The axis of the gyro rotor is positioned to be normally vertical and the frame of the gyro comprised of base 14, legs 15 and 16 and cross member 17 are placed in the normal horizontal plane transverse of the aircraft. Also, a roll servo 107 for actuating both ailerons is shown positioned within one wing of the aircraft and is connected to aileron 108 through the lanyard 109. The servo has a follow-up linkage 110 and is controlled by leads passing through cable 111. The schematic wiring diagram for the guidance system is illustrated in Figure 2 and is supplied with a direct current source 112 controlled by master switch 113. When the rate integrating gyro equipped with piston 89 and cylinder 91 is started, the switch 113 is closed to connect the gyro motor to the electrical source and when the rotor reaches operating speed, the contact 54 moves against contact 50 and energizes the caging solenoid 95 in order to free the wedge 94 and permit the gyro gimbal to precess. It will be noted that the contacts 50 and 54 are in series with the solenoid winding 100 so that the solenoid is controlled by the contacts. After the gyro is up to speed and free to precess, any change in the displacement of the aircraft about the roll axis will result in a change in position of wiper 62 on winding 63. The winding 63 is connected across the power source by leads 114 and 115 and the wiper 62 picks up a voltage from winding 63 which is determined by its position on the winding. The conductor 71 for wiper 62 leads to solenoid winding 116 which in turn is connected to wiper 117 for the follow-up winding 118 through a lead 119. The follow-up winding 118 is likewise connected across the power source 112 by leads 120 and 121 and the wiper 117 is connected to the servo 107 through linkage 110 so as to be positioned by the servo. It is apparent that when both wipers are in their center position, no current will flow through the solenoid winding 116.

In the event that the aircraft is displaced about the roll axis in a direction to move wiper 62 downwardly on winding 63 as seen in Figure 2, it is apparent that the potential of wiper 117 will be positive with respect to the potential of wiper 62 and current will flow from wiper 117 to wiper 62 through winding 116. The field thus developed by solenoid winding 116 will cause the pivotally mounted switch arm 123 to pivot against contact 124, thereby causing current to flow from line 125 to line 126 and through solenoid 127 to ground 127'. The switch arm is normally held in open position by two opposed magnets 125' and 126' and the direction of current through winding 116 will determine the direction in which arm 123 will pivot. The current through solenoid 127 will move switch arm 128 against contact 129 and current will flow through lead 130, servo motor 107, lead 131 and switch arm 132 and then to ground 133. Thus, the servo 107 will be driven in a direction to move the follow-up wiper 117 downward so as to give the usual follow-up action by eliminating the potential difference between the two wipers. The movement of aileron by the servo will cause the aircraft to move toward its original position, and wipers 117 and 62 will be returned to their center positions by the follow-up action when the aircraft assumes its original position.

In the event that the aircraft becomes displaced about the roll axis in a direction to move wiper 62 upwardly on winding 63, then the potential of wiper 62 will become positive with respect to wiper 117 and current will flow from wiper 62 to wiper 117 through winding 116. This current flow will cause switch arm 123 to pivot against contact 134 and current would then be supplied through line 135 and solenoid 136 to ground 127', which would move switch arm 132 against contact 137. Current would then flow through line 125, switch arm 132, lead 131, servo motor 107 and then through switch arm 128 and to ground 133 and cause servo motor 107 to rotate in the opposite direction from that previously discussed. This rotation of the servo motor will move the wiper 117 upwardly on winding 118 in order to give a follow-up action and will also move the aileron 108 to cause the aircraft to return to its original attitude about the roll axis. Since the position of wiper 62 is an indication of the angular displacement of the aircraft about its roll axis, the guidance system of Figure 2 will serve to correct for any displacement of the aircraft about the roll axis.

Thus, it is seen that the present invention provides a very simple method of controlling the displacement of a craft about the roll axis and, of course, the invention is not limited to control about the roll axis since a rate integrating gyro could be positioned to be responsive to displacement about any selected axis. The invention further provides a means of eliminating the conventional two gimbal reference gyro which is very complicated in construction and very expensive since the rate integrating gyro of this invention gives the same displacement signal as does the two gimbal gyro. Further, the invention eliminates the necessity of placing the whole gimbal of the gyro in oil which requires a very complicated construction including means for temperature compensation of the large volume of oil. Also it is contemplated that other types of servo systems can be utilized in connection with the wiper 62 of the gyro, such as servos utilizing on-off pickoffs with mechanical follow-up and straight position servos. In addition, various means can be utilized to exert a torque on the gyro gimbal to purposely precess the gyro in order to turn the aircraft about the axis being controlled. For instance, a torque could be exerted on shaft 22 of the gimbal in order to precess the gyro rotor in either direction to obtain a turn signal.

A modification of the device for producing resistance force against the gimbal which is proportional to the precessional velocity of the gimbal is illustarted in Figures 11, 12 and 13 and like numerals represent like parts as in the previous embodiment. In this modification, the rod 85 is secured in the same manner as in the previous modification to the gimbal 24 by insertion into a block 83 and the link 88 is likewise retained on pin 86 and guided in its movement by U-shaped bracket 87. One end of the link is connected to the hollow piston 89 by means of the pin 90 in the same manner as in the previous embodiment. A detailed view of this connection is illustrated in Figure 13 and shows spacers 138' positioned between the link 88 and the inside circumference of the hollow piston in order to maintain the lever in a centered position on pin 90. In the present modification, the cylinder 139 is closed at the bottom except for an air hole 140 and the piston 89 fits very snugly to cylinder 139 to prevent air from escaping past the piston and out the open end of the cylinder.

The opening 140 connects with the long tube 141 which is spiraled around the cylinder 139 and which exhausts to atmosphere at its end 142. The cylinder is supported on base 14 by means of a nut 143 threaded thereto. In the usual type of air dashpot, the opening 140 would be allowed to exhaust directly to atmosphere and the damping force resulting from air flow through this opening would not necessarily be proportional to the velocity of the piston 89. However, by having the opening 140 exhaust into the long spiral tube 141, the air flow through the tube will be laminar throughout the length of the tube, and this laminar flow will give a resistance to the movement of the piston which will be substantially proportional to the velocity of the piston. Thus the movement of the wiper 62 will measure angular displacement of the craft when the precession of the gyro is resisted by the laminar air flow of the air dashpot, and, of course, such a dashpot could be used for the gyro in the guidance system of Figure 2. Compensation can be made for change in density of the air with temperature by constructing the cylinder 139 of a metal which has a small coefficient of expansion and contraction as compared with the metal of which the piston 89 is composed so that at higher densities more clearance will be allowed between the piston and the cylinder wall in order to permit leakage of a small amount of air past the piston.

Referring to Figures 8, 9 and 10, a modification is also shown for the caging device to be used in connection with the rate integrating gyro. This caging device consists of a solenoid 145 having a circular body 146 which is secured to the leg 15 by means of a circular bracket 147 held by screws 148. A member 149 is retained within the circular body 146 and carries winding 150 for the solenoid. The member 149 has a central, circular opening for receiving shaft 151 which carries at one end the member 104 which has been previously described in connection with the previous embodiment and the surfaces of member 104 engage with wedge 94 to cage the gyroscope. The other end of the shaft 151 carries an armature 152 which is threaded on the shaft 151 and retained in position by lock nut 153. A leaf spring 154 is positioned between body 146 and the armature 152 to continually urge the shaft 151 in a direction to move member 104 out of engagement with wedge 94 and the movement of the shaft in this direction is limited by a stop washer 155 which engages member 149 at the limit of the movement. The winding 150 is placed in series with the circuit for the gyro motor and when the gyro motor is not energized, the member 104 will be held away from wedge 94 by spring 154. However, once the gyro motor is energized, a large amount of starting current will flow through the motor until the gyro is brought up to speed and this current will be sufficient to draw the armature 152 into contact with member 149 against the force of spring 154 in order to have member 104 engage wedge 94 and thereby cage the gyroscope. Once the gyro motor is up to speed, the current through the motor and winding 150 will drop off sufficiently so that the spring 154 can move the armature 152 away from the member 149 and will permit member 104 to release the wedge 94. Thus, when the gyro motor gets up to speed there will not be sufficient current flowing through the motor and through the winding 150 to keep the gyro caged and the gyro will thereafter be free to precess upon displacements of the aircraft about the gyro sensitive axis. It is understood that this modification of the caging device could be utilized with the guidance system illustrated in Figure 2 and that by utilizing a separate circuit, the gyro could be caged through a manual switch at any desired time either before or during operation of the gyro. It is further understood that other types of caging solenoids can be utilized in connection with the subject invention in order to cage the gyro at any desired time.

By the present invention, a rate integrating gyro has been provided which is economical in its construction and simple in its operation. Various modifications of the invention have been described in connection herewith and various other modifications are contemplated by those skilled in the art without departing from the spirit and scope of the invention as hereinafter defined in the appended claims.

What is claimed is:

1. A device for measuring angular displacement of its mounting structure comprising first means for exerting a force proportional to the rate of angular displacement and mounted for movement by said displacement, second means having rigid, relatively movable members for producing a reaction force proportional to the velocity of said relative movement, pivotal linkage means between said first and second means in order to transmit the movement of said first means into relative movement of said members and thereby produce a reaction force on said first means proportional to its velocity of movement, and wherein said second means comprises a cylinder closed at one end with an air opening in said closed end, a piston within said cylinder, the relative movement between said piston and cylinder by said linkage means causing airflow through said opening, and a tube connected to said opening and having laminar flow of air therethrough to resist said relative movement.

2. A rate integrating gyro comprising a gyro rotor mounted in a single gimbal for precessional movement about the axis of said gimbal, a member fastened at one end to said gimbal for movement therewith, a piston having a piston rod pivotally connected to the other end of said member, and a cylinder for said piston, said cylinder being coated with a highly adhesive oil to resist movement of said piston with a force proportional to the velocity of the piston.

3. A rate integrating gyro as defined in claim 2 wherein said cylinder is constructed of a material having a low coefficient of contraction and expansion with change in temperature and said piston is constructed of a material having a high coefficient of contraction and expansion.

4. A rate integrating gyro comprising a gyro rotor mounted in a single gimbal for precessional movement about the axis of said gimbal, a link fastened at one end to said gimbal for movement therewith, a piston having a piston rod pivotally connected to the other end of said link, an air cylinder closed at one end and open at the other end for receiving said piston and a tube connected to an opening in the closed end of said cylinder, said tube providing laminar flow of air throughout its length to provide a resistance force on said piston.

5. A rate integrating gyro comprising a gyro rotor mounted in a movable craft by a single gimbal, said gyro rotor being positioned within said craft in order to precess upon displacement of said craft about a selected axis thereof, means comprising two members movable longitudinally relative to one another for developing a resistance force proportional to velocity of said relative movement, a rigid link connecting said gimbal with one of said members to transfer the movement of said gimbal into relative movement of said members and pick-off means positioned about the gimbal axis to obtain a signal which is a function of displacement of said craft about said selected axis.

6. A rate integrating gyro as defined in claim 5 wherein one of said members is a piston connected to said gimbal for movement therewith and the other of said members is a cylinder for said piston coated with a highly adhesive oil so that the resistance force is developed by the shearing of oil particles upon relative movement between said piston and said cylinder.

7. A control system as defined in claim 5 wherein said two members are composed of a piston connected to said gimbal for movement therewith and an air dashpot cylinder having an opening in the closed end thereof, and a tube for connecting said opening with atmosphere, said tube having substantially laminar air flow to provide said resistance force.

8. A device for caging a gyroscope to its null or any other selected position comprising a gyro carried by a single gimbal shaft for rotation about the gimbal shaft axis, a V-shaped wedge secured to one end of said gimbal shaft, an electromagnet having a winding and an armature movable against a spring upon operation of said electromagnet, a notched member movable with said armature into contact with said wedge in order to cage said gyro, and means for energizing said winding to move said member.

9. A caging device as defined in claim 8 wherein said winding is in series with the motor of the gyro so that said winding is operated by the large starting current for the motor to move said armature against said spring and is inoperative to move said armature against said spring when it receives the normal operating current of the gyro motor.

10. A caging device as defined in claim 8 wherein said notched member has four sides, two of which are at an angle greater than the V-angle of said wedge and two of which are at an angle substantially equal to the V-angle of said wedge, said two surfaces of greater angle being positioned closer to said wedge than the other two surfaces when the gyro is uncaged.

11. A device for caging a gyroscope to its null or any other selected position comprising a gyro carried by a gimbal shaft for rotation about the gimbal shaft axis, a V-shaped wedge secured to one end of said gimbal shaft, an electromagnet having a winding and an armature movable against a spring upon energization of said winding, a notched member carried by said armature and normally held by a spring in contact with said wedge to cage said gyro and means for energizing said winding to move said member away from said wedge to uncage said gyro.

12. A device as defined in claim 11 wherein said winding is energized by a centrifugal switch carried by the gyro rotor and in series with said winding in order to energize said winding and move said member away from said wedge to uncage said gyro when the gyro rotor reaches operating speed.

13. A caging device as defined in claim 11 wherein said notched member has four sides, two of which are at an angle greater than the V-angle of said wedge and two of which are at an angle substantially equal to the V-angle of said wedge.

14. A rate integrating gyro for a movable craft comprising a mounting structure secured to said craft, a gyroscope carried by said structure and comprising a gyro rotor mounted by a single gimbal, said gyroscope being positioned within said craft in order to precess upon displacement of said craft about a selected axis thereof, means rigidly secured to said gimbal for movement therewith about the axis of the gimbal, a piston connected to said means for movement in response to rotation of said gimbal and a cylinder supported by said mounting structure in position to receive said piston, said cylinder being open at both ends and coated with a highly adhesive oil so that movement of said piston relative to said cylinder will result in shearing of oil particles and the piston will receive a resisting force proportional to the velocity of its movement.

15. A control system for a movable craft comprising a mounting structure secured to said craft, a gyroscope carried by said structure and comprising a gyro rotor mounted by a single gimbal, said gyroscope being positioned within said craft in order to precess upon displacement of said craft about a selected axis thereof, means rigidly secured to said gimbal for movement therewith about the axis of the gimbal, a piston connected to said means for movement in response to rotation of said gimbal, a cylinder supported by said mounting structure in a position to receive said piston, said cylinder being closed at one end and having an air opening at the closed end, and a tube spiraled around said cylinder for connecting said opening to atmosphere, the laminar flow of air through said tube in response to movement of said piston causing a resistance force on said piston proportional to its velocity.

16. A device for measuring angular displacement of its mounting structure comprising first means for exerting a torque proportional to the rate of angular displacement and mounted for movement by said displacement, second means having rigid, relatively movable members for producing a reaction torque proportional to the velocity of said relative movement, and pivotal linkage means between said first and said second means in order to transmit the movement of said first means into relative movement of said members and thereby produce a reaction torque on said first means proportional to its angular velocity of movement, said second means comprising a cylinder coated with a highly adhesive oil and a piston therein, the relative movement of said piston and cylinder by said linkage means developing said reaction torque by shearing particles of oil.

References Cited in the file of this patent

UNITED STATES PATENTS

| | | |
|---|---|---|
| 1,788,807 | Sperry | Jan. 13, 1931 |
| 1,900,709 | Henderson | Mar. 7, 1933 |
| 1,939,375 | Urfer | Dec. 12, 1933 |
| 1,946,657 | Zand | Feb. 13, 1934 |
| 1,985,148 | Chappell et al. | Dec. 18, 1934 |
| 2,441,157 | Kissel | May 11, 1948 |
| 2,646,947 | Kutzler | July 28, 1953 |
| 2,679,366 | Noxon | May 25, 1954 |
| 2,703,935 | Mead et al. | Mar. 15, 1955 |
| 2,709,921 | Sylvan | June 7, 1955 |

FOREIGN PATENTS

| | | |
|---|---|---|
| 27,590 | Great Britain | June 9, 1910 |